(12) United States Patent
Rusciolelli et al.

(10) Patent No.: US 9,675,008 B1
(45) Date of Patent: Jun. 13, 2017

(54) UNLOADING ARRANGEMENT FOR AGRICULTURAL HARVESTING VEHICLES

(71) Applicant: CNH Industrial America LLC, New Holland, PA (US)

(72) Inventors: Adam R. Rusciolelli, Chicago, IL (US); Tyson Dollinger, Mazon, IL (US); Brian R. Ray, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/056,531

(22) Filed: Feb. 29, 2016

(51) Int. Cl.
| | |
|---|---|
| *B62D 13/06* | (2006.01) |
| *A01D 90/10* | (2006.01) |
| *B65G 67/24* | (2006.01) |
| *G08G 1/00* | (2006.01) |

(52) U.S. Cl.
CPC ............ *A01D 90/10* (2013.01); *B62D 13/06* (2013.01); *B65G 67/24* (2013.01); *G08G 1/22* (2013.01)

(58) Field of Classification Search
CPC ........ A01D 90/10; B65G 67/24; B62D 13/06; G08G 1/22
See application file for complete search history.

(56) References Cited

U.S. PATENT DOCUMENTS

| | | |
|---|---|---|
| 5,247,442 A | 9/1993 | Kendall |
| 6,216,071 B1 | 4/2001 | Motz |
| 6,587,772 B2 | 7/2003 | Behnke |
| 6,638,159 B2 | 10/2003 | Krone et al. |
| 6,682,416 B2 | 1/2004 | Behnke et al. |
| 6,732,024 B2 | 5/2004 | Wilhelm Rekow et al. |
| 7,277,784 B2 | 10/2007 | Weiss |
| 7,480,564 B2 | 1/2009 | Metzler et al. |
| 7,721,516 B2 | 5/2010 | Wendling |
| 8,060,283 B2 | 11/2011 | Mott et al. |
| 8,275,491 B2 | 9/2012 | Ferrin et al. |
| 8,280,595 B2 | 10/2012 | Foster et al. |

(Continued)

FOREIGN PATENT DOCUMENTS

| | | |
|---|---|---|
| EP | 0 070 340 A1 | 7/1981 |
| JP | 2-242602 A1 | 9/1990 |

*Primary Examiner* — Todd Melton
(74) *Attorney, Agent, or Firm* — Rickard K. DeMille; Rebecca L. Henkel

(57) ABSTRACT

An unloading arrangement includes and agricultural harvester and a transport vehicle arrangement. The agricultural harvester includes an unloading conveyance and a wireless transmitter for transmitting information relating at least to a speed and direction of the harvester. The transport vehicle arrangement includes a transport vehicle; a transport implement coupled with the transport vehicle; a sensor arrangement for establishing an angular orientation of the transport implement relative to the transport vehicle; a wireless receiver for receiving the transmitted information from the harvester; and an electrical processing circuit coupled with the sensor arrangement and the wireless receiver. The electrical processing circuit is configured for steering the transport vehicle arrangement in a reverse direction such that the transport implement is positioned at a desired position relative to the unloading conveyance, based upon the sensed angular orientation of the transport implement and the transmitted information received from the harvester.

14 Claims, 3 Drawing Sheets

(56) References Cited

U.S. PATENT DOCUMENTS

| | | |
|---|---|---|
| 8,326,473 B2 | 12/2012 | Simpson et al. |
| 8,428,829 B2 | 4/2013 | Brunnert et al. |
| 8,544,574 B2 | 10/2013 | Fegley et al. |
| 8,755,976 B2 * | 6/2014 | Peters ................. A01B 69/008 382/106 |
| 8,814,640 B2 * | 8/2014 | Behnke ............... A01B 69/008 460/114 |
| 2010/0332051 A1 | 12/2010 | Kormann |
| 2011/0022273 A1 | 1/2011 | Peters et al. |
| 2011/0112730 A1 | 5/2011 | Rekow |
| 2012/0215394 A1 | 8/2012 | Wang et al. |
| 2012/0302299 A1 | 11/2012 | Behnke et al. |
| 2016/0114831 A1 * | 4/2016 | Laine ................. B62D 15/0285 701/41 |

* cited by examiner

UNLOADING ARRANGEMENT FOR AGRICULTURAL HARVESTING VEHICLES

BACKGROUND OF THE INVENTION

1. Field of the Invention

The present invention relates to agricultural harvesters, and, more particularly, to unloading arrangements used to unload crop from a harvester and transport the crop to another location.

2. Description of the Related Art

Semi-autonomous systems may be used in the agricultural and industrial sectors to provide increased efficiencies when using work vehicles such as tractors, combines, etc. Such systems typically use geospatial data associated with the vehicle (such as GPS data) to automatically guide the vehicle through a certain area such as a field, work site, etc. These systems are designated "semi-autonomous" in the sense that an operator is still present within the operator cab, and may take over manual operation of the vehicle when necessary.

The advent of semi-autonomous systems has reduced the skill required and reliability of unloading on-the-go operations in conventional manners. However, there are still instances where these systems do not handle certain use cases or where these systems could be leveraged for greater efficiencies and functionality.

Large Harvester Headers: As combine headers become larger, they extend laterally further from each side of the harvester. This in turn pushes the lateral location of the transport vehicle further and further away from the harvester. The design of exceedingly longer unloading tubes are required to allow unloading of harvesters to adjacent vehicles. These long unload tubes are costly and make operation, transportation and storage of machines difficult. If there were a way to eliminate the need for the long unload tubes, the manufacturer and operator would both benefit.

Breaking Through a "Land": In high yielding crops (such as corn), harvesters often have to 'break through' areas where there is crop on both sides of the harvester, preventing unloading operations. In given instances, the harvester will need to unload by running down crop leading to crop lost.

Sugar Cane Harvester Operations: There are special cases where loading wagons alternate between being driven in reverse and forward during the unloading process to increase the speed of transitioning and reduce crop damage by limiting amount of cane stubble driven on. Without having an ability to operate in reverse, the semi-autonomous systems will not meet this use case need.

What is needed in the art is a way of unloading a crop from a harvester under nearly all use conditions.

SUMMARY OF THE INVENTION

The present invention provides an unloading arrangement which uses a semi-autonomous guidance system to position and drive the transport vehicle in a reverse direction during an unloading operation.

The invention in one form is directed to an unloading arrangement for agricultural harvesting vehicles. The unloading arrangement includes and agricultural harvester and a transport vehicle arrangement. The agricultural harvester includes an unloading conveyance and a wireless transmitter for transmitting information relating at least to a speed and direction of the harvester. The transport vehicle arrangement includes a transport vehicle; a transport implement coupled with the transport vehicle; a sensor arrangement for establishing an angular orientation of the transport implement relative to the transport vehicle; a wireless receiver for receiving the transmitted information from the harvester; and an electrical processing circuit coupled with the sensor arrangement and the wireless receiver. The electrical processing circuit is configured for steering the transport vehicle arrangement in a reverse direction such that the transport implement is positioned at a desired position relative to the unloading conveyance, based upon the sensed angular orientation of the transport implement and the transmitted information received from the harvester.

The invention in another form is directed to a method of unloading a crop from an agricultural harvester to a transport implement coupled with a transport vehicle. The method includes the steps of:

transmitting information from the harvester to the transport vehicle relating at least to a speed and direction of the harvester;

sensing an angular orientation of the transport implement relative to the transport vehicle; and operating the transport vehicle in a reverse direction such that the transport implement is positioned at a desired position relative to the unloading conveyance, based upon the sensed angular orientation of the transport implement and the transmitted information received from the harvester.

An advantage of the present invention is that the unloading operation can occur "on-the-fly" with the transport vehicle traveling in the reverse direction.

Another advantage is that the transport vehicle arrangement is steered semi-autonomously in the reverse direction, which allows unloading at a typical harvest speed that may not be possible with manual steering in the reverse direction.

Yet another advantage is that sensors can be used to determine the relative angular orientation between the transport vehicle and the transport implement.

A further advantage is that the angular orientation can be used in combination with the speed and direction data for the harvester to accurately guide the transport implement to a predefined location relative to the harvester.

A still further advantage is that the transport implement can be positioned either behind the header or at the rear of the harvester during an unloading operation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
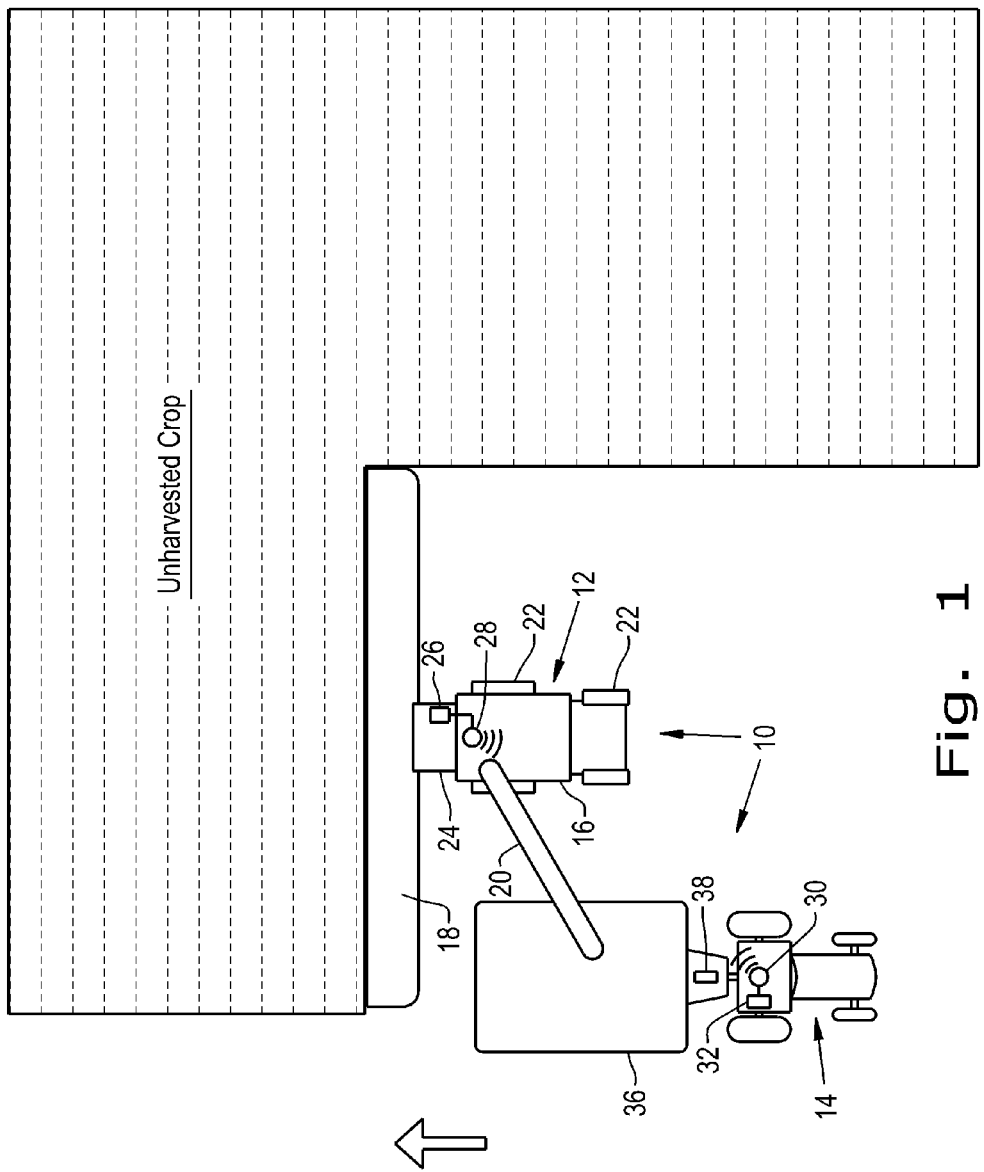
FIG. 1 is a plan view of an unloading arrangement for agricultural harvesting vehicles, including a transport vehicle arrangement positioned behind a header of an agricultural harvester.

Referring now to the drawings, and more particularly to FIG. 1, there is shown an embodiment of an unloading arrangement 10 for agricultural harvesting vehicles 12 and 14. In the illustrated embodiment, vehicle 12 is in the form of an agricultural harvester and vehicle 14 is in the form of a transport vehicle, each of which are described in more detail below.

Agricultural harvester 12 includes a base unit 16, header 18 and unloading conveyance 20. Base unit 16 can include a prime mover (e.g., diesel engine, not shown), ground engaging members 22 (e.g., tires and/or tracks) and an operator cab 24. Typically one or more electrical processing circuits in the form of a digital electronic control unit (ECU) 26 are carried onboard the base unit 16, such as within the operator cab 24 away from the dust, dirt, etc.

Header 18 can be suitably configured as a standard header, such as a grain cutting platform (e.g., bean header) or a row crop header (e.g., corn header). Other types of headers such as a header used for sugarcane or the like can also be used.

Unloading conveyance 20 may be an unloading auger (as shown), a belt conveyor, or some other type of suitable conveyance. As is apparent, when the header 18 becomes wider it is more and more difficult to make and use an unloading conveyance 20 which is sufficiently long to extend laterally past the lateral end of the header 18. In such cases it is no longer possible to position the transport vehicle 14 alongside of the header 18 during an unloading operation.

Harvester 12 and transport vehicle 14 are also equipped for wireless communication therebetween. Preferably harvester 12 and transport vehicle 14 are each equipped with a respective wireless transceiver 28, 30 for two-way wireless communication therebetween. Transceiver 28 can be coupled with ECU 26 onboard the harvester 12, and transceiver 30 can be coupled with an ECU 32 onboard the transport vehicle 12. Wireless transceiver 28 can transmit information relating to a speed and direction of the harvester 12. Additionally, wireless transmitter 28 can also transmit other selected information, such as the GPS coordinates of the harvester 12, an anticipated future unloading location, etc. In another embodiment, the harvester 12 and transport vehicle 14 need not be equipped with a transceiver; rather, at a minimum, harvester 12 can be equipped with a transmitter and transport vehicle 14 can be equipped with a receiver for transmission and receipt of the wireless information.

The transport vehicle 14 is part of a transport vehicle arrangement 34, which also includes a transport implement 36 coupled with the transport vehicle 14. In the embodiment shown, the transport implement 36 is assumed to be a grain cart, but it can also be differently configured, such as a wagon or a gravity box.

Figure 2:
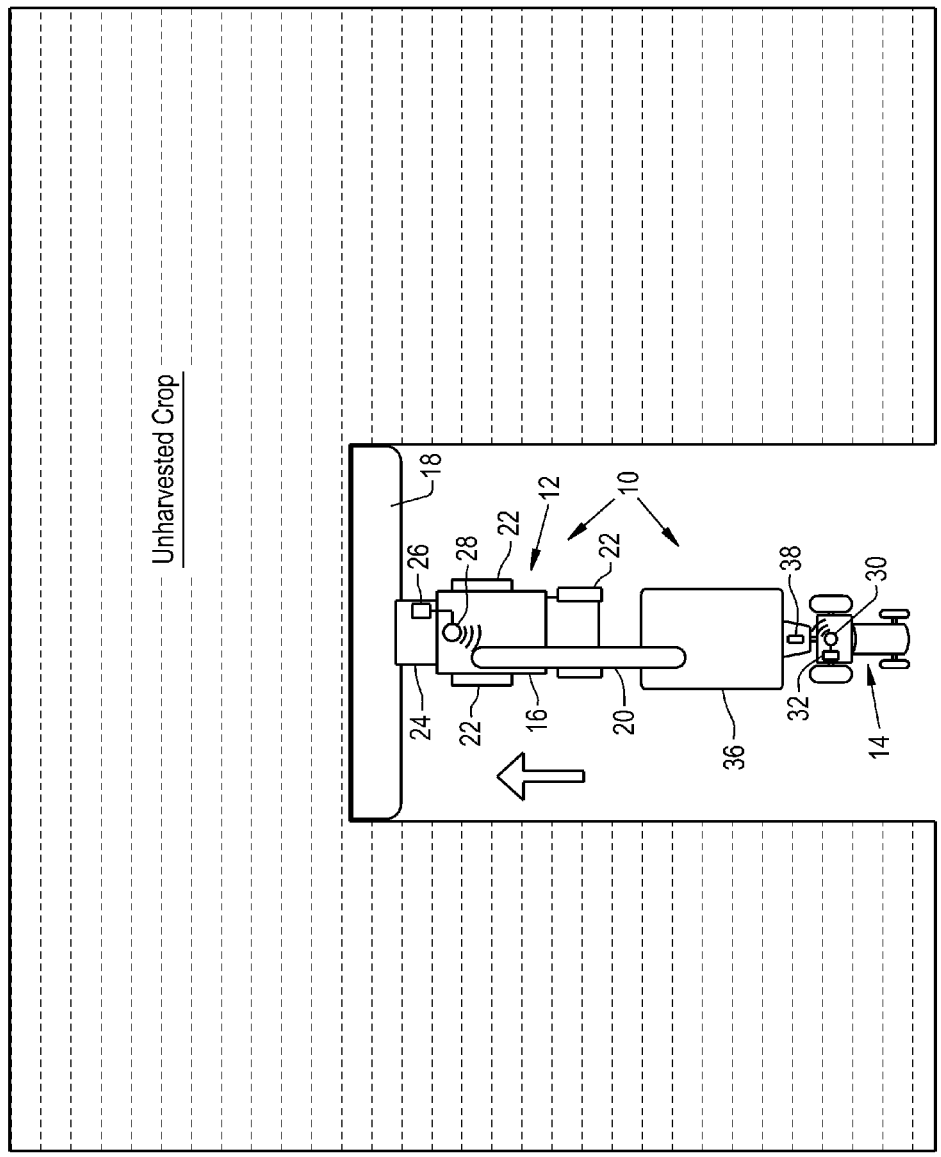
FIG. 2 is a plan view of an unloading arrangement for agricultural harvesting vehicles, including a transport vehicle arrangement positioned behind the agricultural harvester.

According to an aspect of the present invention, the transport vehicle 14 can be operated in a semi-autonomous mode such that the transport implement 36 can be automatically driven in a reverse direction during an unloading operation. This allows the transport implement to be positioned either behind the header 18 (FIG. 1) or behind the harvester 12 (FIG. 2).

Figure 3:
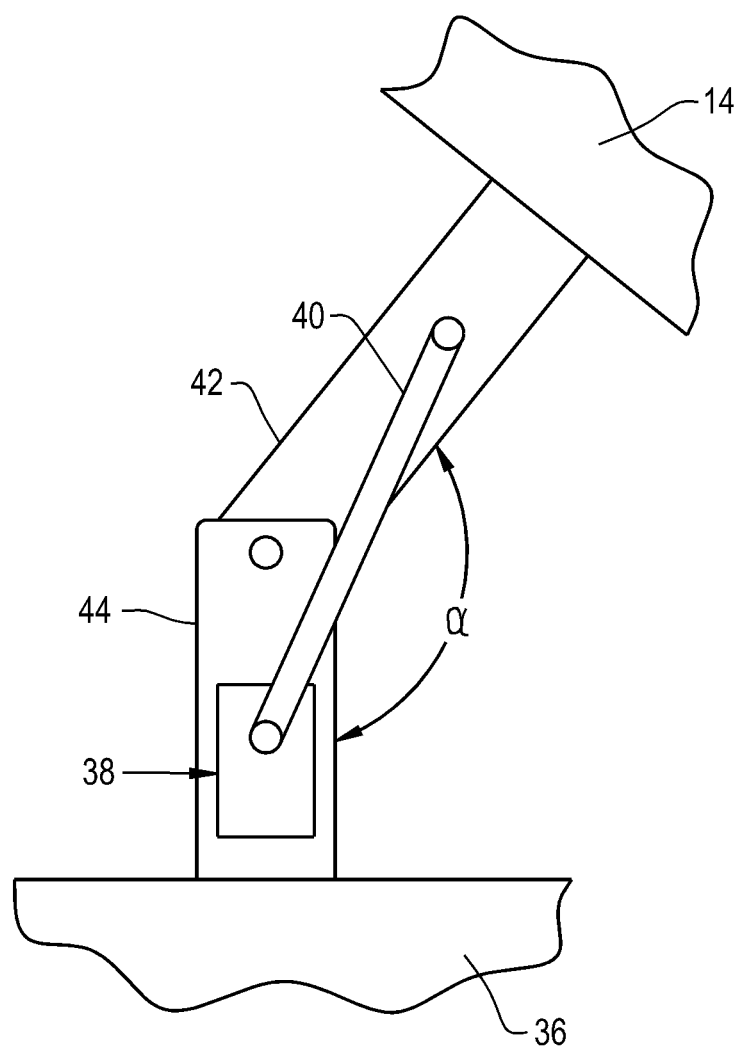
FIG. 3 is a fragmentary, schematic illustration of an embodiment of a sensor arrangement which can be used to determine the angular orientation between the transport vehicle and the transport implement.

To that end, a sensor arrangement 38 (shown in FIGS. 1 and 2, and in more detail in FIG. 3) can sense and provide one or more output signals establishing an angular orientation of the transport implement 36 relative to the transport vehicle 14. In one embodiment, the sensor arrangement 38 can be configured as a rotary actuator with an arm 40 extending between a hitch 42 associated with transport vehicle 14 and a tongue 44 associated with transport implement 36. The rotary actuator provides one or more output signals representing an angular orientation (such as an angle $\alpha$) between the hitch 42 and tongue 44. The output signals can be outputted to the ECU 32 onboard the transport vehicle 14 to automatically steer the transport implement 36 in the reverse direction at an operating/unloading speed. Other types of sensor arrangements 38 are also possible.

During an unloading operation, the ECU 32 is coupled with and receives signals from each of the sensor arrangement 38 and the wireless transceiver 30 (either wired and/or wireless). The ECU 32 is configured for steering the transport vehicle arrangement in a reverse direction such that the transport implement 36 is positioned at a desired position relative to the unloading conveyance 20, based upon the sensed angular orientation of the transport implement 36 and the transmitted information received from the harvester 12. Of course, the ECU 32 can use further information such as GPS data for the harvester 12, ground speed of the transport vehicle 14, etc for proper placement of the transport implement 36

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An unloading arrangement for agricultural harvesting vehicles, comprising:
   an agricultural harvester including an unloading conveyance and a wireless transmitter for transmitting information relating at least to a speed and direction of the harvester; and
   a transport vehicle arrangement including:
      a transport vehicle;
      a transport implement coupled with the transport vehicle;
      a sensor arrangement for establishing an angular orientation of the transport implement relative to the transport vehicle;
      a wireless receiver for receiving the transmitted information from the harvester; and
      an electrical processing circuit coupled with the sensor arrangement and the wireless receiver, the electrical processing circuit being configured for steering the transport vehicle arrangement in a reverse direction such that the transport implement is positioned at a desired position relative to the unloading conveyance, based upon the sensed angular orientation of the transport implement and the transmitted information received from the harvester.

2. The unloading arrangement of claim 1, wherein the transport vehicle includes a hitch, and the transport implement includes a tongue, and wherein the sensor arrangement is associated with at least one of the hitch and the tongue.

3. The unloading arrangement of claim 2, wherein the sensor arrangement is associated with the tongue of the transport implement.

4. The unloading arrangement of claim 1, wherein the electrical processing circuit comprises a digital electronic control unit (ECU).

5. The unloading arrangement of claim 1, wherein the harvester includes a header and the transport implement is positioned directly behind one end of the header during an unloading operation.

6. The unloading arrangement of claim 1, wherein the transport implement is positioned directly behind the harvester during an unloading operation.

7. The unloading arrangement of claim 1, wherein the wireless transmitter is part of a wireless transceiver associated with the harvester, and the wireless receiver is part of a wireless transceiver associated with the transport vehicle.

8. The unloading arrangement of claim 1, wherein the transport vehicle comprises a tractor, and the transport implement comprises a cart, a wagon or a gravity box.

9. A method of unloading a crop from an agricultural harvester to a transport implement coupled with a transport vehicle, comprising the steps of:
   transmitting information from the harvester to the transport vehicle relating at least to a speed and direction of the harvester;
   sensing an angular orientation of the transport implement relative to the transport vehicle; and
   operating the transport vehicle in a reverse direction such that the transport implement is positioned at a desired position relative to the unloading conveyance, based upon the sensed angular orientation of the transport implement and the transmitted information received from the harvester.

10. The method of claim 9, wherein the transport vehicle includes a hitch, and the transport implement includes a tongue, and wherein the sensing step is carried out using a sensor arrangement which is associated with at least one of the hitch and the tongue.

11. The method of claim 10, wherein the sensor arrangement is associated with the tongue of the transport implement.

12. The method of claim 9, wherein the operating step is carried out using a digital electronic control unit (ECU) onboard the transport vehicle.

13. The method of claim 9, wherein the harvester includes a header and the transport implement is positioned directly behind one end of the header during unloading.

14. The method of claim 9, wherein the transport implement is positioned directly behind the harvester during unloading.

* * * * *